US011282264B2

(12) United States Patent
Chen

(10) Patent No.: US 11,282,264 B2
(45) Date of Patent: Mar. 22, 2022

(54) VIRTUAL REALITY CONTENT DISPLAY METHOD AND APPARATUS

(71) Applicant: Tencent Technology (Shenzhen) Company Limited, Shenzhen (CN)

(72) Inventor: Xingbai Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 44 days.

(21) Appl. No.: 16/525,232

(22) Filed: Jul. 29, 2019

(65) Prior Publication Data
US 2019/0355170 A1 Nov. 21, 2019

Related U.S. Application Data

(63) Continuation of application No. PCT/CN2017/091613, filed on Jul. 4, 2017.

(51) Int. Cl.
*G06T 15/20* (2011.01)
*G06T 15/04* (2011.01)
*G06T 17/20* (2006.01)

(52) U.S. Cl.
CPC ............. *G06T 15/20* (2013.01); *G06T 15/04* (2013.01); *G06T 17/20* (2013.01); *G06T 2210/21* (2013.01)

(58) Field of Classification Search
None
See application file for complete search history.

(56) References Cited

U.S. PATENT DOCUMENTS

| 2009/0274354 A1* | 11/2009 | Ng | A61B 6/4028 382/131 |
| 2011/0187706 A1* | 8/2011 | Vesely | G06F 3/013 345/419 |

(Continued)

FOREIGN PATENT DOCUMENTS

| CN | 103792674 A | 5/2014 |
| CN | 105447898 A | 3/2016 |

(Continued)

OTHER PUBLICATIONS

Sato, Tomokazu, Koshizawa Hiroyuki, and Naokazu Yokoya. "Omnidirectional free-viewpoint rendering using a deformable 3-d mesh model." (2009). (Year: 2009).*

(Continued)

*Primary Examiner* — Sarah Le
(74) *Attorney, Agent, or Firm* — Morgan, Lewis & Bockius LLP

(57) ABSTRACT

Embodiments of this application disclose a virtual reality content display method performed at a computing device, the method including the following processing steps: receiving a video stream including a sequence of video frames and obtaining a video frame to be displayed from the video stream; identifying a preset key information area in the video frame; rendering the video frame on an imaging panel, to form a virtual reality content image for display; determining that the preset key information area is being viewed by a user along a line of sight direction on the imaging panel; and in accordance with the determination, displaying a render mesh at a predetermined position between the imaging panel and a virtual camera collocated with the user and displaying the preset key information area at a position closer to the user along the line of sight direction.

17 Claims, 10 Drawing Sheets

(56) References Cited

U.S. PATENT DOCUMENTS

| | | | |
|---|---|---|---|
| 2015/0022645 A1* | 1/2015 | Bouazizi | H04N 13/122 |
| | | | 348/51 |
| 2015/0063632 A1* | 3/2015 | Deng | G06T 7/70 |
| | | | 382/103 |
| 2016/0150950 A1* | 6/2016 | Yu | A61B 3/14 |
| | | | 351/206 |
| 2016/0183779 A1* | 6/2016 | Ren | G02B 21/0012 |
| | | | 351/206 |
| 2016/0366392 A1* | 12/2016 | Raghoebardajal | H04N 13/161 |
| 2016/0378176 A1 | 12/2016 | Shui et al. | |
| 2017/0285737 A1* | 10/2017 | Khalid | G06F 3/011 |
| 2017/0287107 A1* | 10/2017 | Forutanpour | G06T 3/0062 |
| 2017/0318235 A1* | 11/2017 | Schneider | G06K 9/00664 |

FOREIGN PATENT DOCUMENTS

| | | |
|---|---|---|
| CN | 106162177 A | 11/2016 |
| CN | 106210703 A | 12/2016 |
| CN | 106293557 A | 1/2017 |
| CN | 106296686 A | 1/2017 |
| CN | 106339082 A | 1/2017 |
| CN | 106375830 A | 2/2017 |
| CN | 106445550 A | 2/2017 |
| CN | 106464854 A | 2/2017 |
| CN | 106598233 A | 4/2017 |
| CN | 106649508 A | 5/2017 |
| CN | 106774824 A | 5/2017 |
| CN | 106861185 A | 6/2017 |

OTHER PUBLICATIONS

Duchowski, Andrew, et al. "3-D eye movement analysis." Behavior Research Methods, Instruments, & Computers 34.4 (2002): 573-591. (Year: 2002).*

Scratchapixel, "3D Viewing the Pinhole Camera Model (Implementing a Virtual Pinhole Camera)" posted Jan. 19. 2015, https://www.scratchapixel.com/lessons/3d-basic-rendering/3d-viewing-pinhole-camera/implementing-virtual-pinhole-camera (Year: 2015).*

Tencent Technology, WO, PCT/CN2017/091613, Mar. 28, 2018, 4 pgs.

Tencent Technology, IPRP, PCT/CN2017/091613, Jan. 7, 2020, 5 pgs.

Tencent Technology, ISR, PCT/CN2017/091613, Mar. 28, 2018, 3 pgs.

* cited by examiner

S202

Obtain markup information for marking the preset key information area from the video stream — S401

Obtain the marked preset key information area from the video frame according to the markup information — S402

Determine a display area of the preset key information area on the imaging panel according to the markup information — S501

Set a virtual collision body at a position of the display area of the preset key information area, the virtual collision body wrapping the display area of the preset key information area — S502

Project a ray from the virtual camera along a user perspective direction — S503

Confirm that the user is watching the preset key information area when determining that the ray collides with the virtual collision body — S504

FIG. 5

VIRTUAL REALITY CONTENT DISPLAY METHOD AND APPARATUS

CROSS-REFERENCE TO RELATED APPLICATIONS

This application is a continuation application of PCT/CN2017/091613, entitled "VIRTUAL REALITY CONTENT DISPLAY METHOD AND APPARATUS" filed on Jul. 4, 2017, which is incorporated by reference in its entirety.

FIELD OF THE TECHNOLOGY

This application relates to the field of computer technologies, and in particular, to a virtual reality content display method and apparatus.

BACKGROUND OF THE DISCLOSURE

With the development of smart user equipment, a virtual reality (VR) technology is increasingly applied to ordinary user equipment, such as smart phones, tablet computers, and PCs. Therefore, various VR software (such as a VR video APP) appears. A user wears a VR wearable device such as a helmet or glasses connected to the user equipment, and can view a VR panoramic image displayed by VR software, and can obtain immersive experience in a three-dimensional space visual view.

At present, there are some VR platforms, and a VR application client can be installed in the user equipment. Each VR application client can access VR panoramic image data by accessing a VR application server in the VR platform and display the VR panoramic image data to the user. For example, the VR application client can obtain VR video data from the VR application server and play the VR video data, and the user can experience an immersive panoramic video by wearing a VR head mounted display device (such as a helmet and glasses) connected to the VR application client.

SUMMARY

Embodiments of this application provide a virtual reality content presentation method and apparatus, so that in a virtual reality environment, a user can more clearly view a key information area, thereby improving immersive experience of the user.

According to a first aspect of this application, an embodiment of this application provides a virtual reality content display method performed at a computing device having one or more processors and memory storing programs to be executed by the one or more processors, the method comprising:
  receiving a video stream including a sequence of video frames;
  obtaining a video frame to be displayed from the video stream;
  identifying a preset key information area in the video frame;
  rendering the video frame on an imaging panel, to form a virtual reality content image for display;
  determining that the preset key information area is being viewed by a user along a line of sight direction; and
  in accordance with the determination, displaying the preset key information area at a position closer to the user along the line of sight direction.

According to a second aspect of this application, an embodiment of this application provides a computing device comprising one or more processors, memory coupled to the one or more processors and a plurality of programs stored in the memory that, when executed by the one or more processors, cause the computing device to perform the aforementioned virtual reality content display method.

According to a third aspect of this application, an embodiment of this application provides a non-transitory computer readable storage medium storing a plurality of machine readable instructions in connection with a computing device having one or more processors, wherein the plurality of machine readable instructions, when executed by the one or more processors, cause the terminal to perform the aforementioned virtual reality content display method.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 4 is a flowchart of a virtual reality content display method according to an embodiment of this application.

FIG. 5 is a flowchart of a virtual reality content display method according to an embodiment of this application.

DESCRIPTION OF EMBODIMENTS

Figure 1:
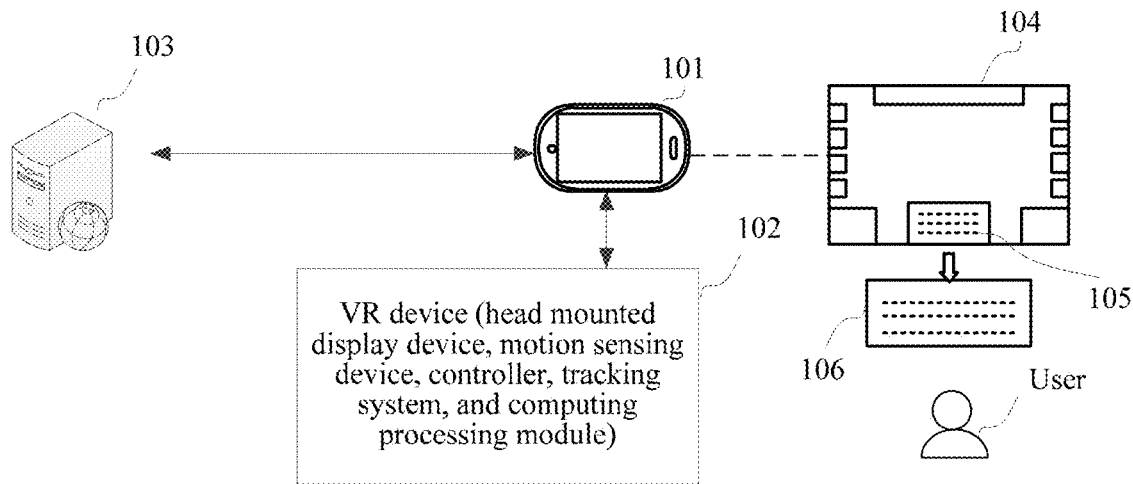
FIG. 1 is a schematic diagram of an application environment of a virtual reality content display method and apparatus according to an embodiment of this application.

The following clearly and completely describes the technical solutions in the embodiments of the present application with reference to the accompanying drawings in the embodiments of the present application. Apparently, the described embodiments are some embodiments of the present application rather than all of the embodiments. All other embodiments obtained by a person of ordinary skill in the art based on the embodiments of this application without creative efforts shall fall within the protection scope of this application.

Virtual reality (VR) is referred to as a virtual technology for short and is also referred to as a virtual environment, uses computer simulation to generate a virtual world of three-dimensional (3D) space, and provides simulation regarding senses such as sight to a user, so that the user feels like that he is immersed in a situation, to observe objects in the three-dimensional space in time and without limits. When the user moves the position, the computer can immediately perform complex operations to transmit back an accurate three-dimensional world video to generate a sense of presence. The technology integrates the latest development results of computer graphics, computer simulation, artificial intelligence, sensing, display, and network parallel processing, and is a high-technology simulation system generated with the help of a computer technology.

In nature, because two eyes of a person are different in position, seen images of objects in space are slightly different. A brain determines a distance between an object in space and the person by using a difference between the images of the objects seen by the two eyes. Distance information may also be obtained through other methods, such as a focal distance between eyes and comparison of object sizes. A principle of a VR technology is similar to using two parallel virtual cameras, to respectively correspond to a left eye and a right eye of the person, to obtain an image of an object, forming a VR image through composition, and projecting the VR image on an imaging plane in a virtual environment, for the user to view.

With the development of the VR technology, it is a new attempt to apply the VR technology to the live broadcast field. For example, a live game competition video is viewed through a VR technology. In such an application scenario, a mobile phone may be placed in a VR head mounted display device. After wearing the VR head mounted display device, a user can view a VR live game competition video in the mobile phone. However, in this case, when the user views the VR live game competition video by using the VR head mounted display device, because an area seen by a single eye is approximately ½ of an area that can be seen by two eyes when a mobile phone live video and a PC live video are viewed with naked eyes in a common live broadcast solution. Therefore, VR live broadcast is much more vague that a common live broadcast solution when immersive large screen experience is created. Using an example of a VR live game (such as LOL) competition, even if a live stream resolution already reaches 1080P, limited by a resolution occupied by a rendered video in a VR environment, some key information (such as equipment Kill-Death-Assist (KDA) information during competition and a map) areas in a game cannot be clearly seen.

Based on the above, an embodiment of this application provides a virtual reality content display method and apparatus, so that in a virtual reality environment, a user can more clearly view a key information area, thereby improving immersive experience of the user.

FIG. 1 is a schematic diagram of an application environment of a virtual reality content display method and apparatus according to an embodiment of this application. As shown in FIG. 1, the application environment 100 includes a terminal device 101, a VR device 102, and a server 103. A VR client (that is, a VR application program) may be run in the terminal device 101. The VR device 102 may include a controller operable to the user and a wearable device (such as various VR head mounted display devices and VR motion sensing devices). A structure for placing the terminal device 101 may be constructed in the VR device 102. The terminal device 101 is, for example, a mobile phone. The user views VR content from a screen of the terminal device 101 through a lens used as a stereoscope instead of a display in the VR device 102. The VR client in the terminal device 101 may exchange information with the VR device 102, to provide an immersive VR image to the user and complete a corresponding operation function. Specifically, the VR client may display corresponding VR image data for the user according to position information and motion information of the user in virtual space that is provided by the wearable device, to bring immersive experience to the user. The VR client may also perform a corresponding operation in response to an instruction sent by the user to operate the controller, for example, open/pause/close a video file. The terminal device 101 may also be placed outside the VR device 102 or communicate with the VR device 102 in a wired or wireless manner, to transfer rendered virtual reality content to the display of the VR device 102 for display.

Corresponding VR application server software (referred to as a VR server or a VR platform for short) may be run in the server 103. The VR server may provide various panoramic image data, such as a panoramic picture, a panoramic video, and a VR game, to the VR clients.

Herein, the terminal device 101 is a terminal device having a data computing processing function and includes, but is not limited to, a smartphone, a palm computer, a tablet computer, and a smart TV (in which a communications modules is installed). Operating systems are installed on these terminal devices and include, but are not limited to: an Android operating system, a Symbian operating system, a Windows mobile operating system, and an iPhone OS operating system.

In the virtual reality content display method and apparatus provided in this embodiment of this application, in a process in which the user wears the VR device 102 to view a VR live video played through the VR client on the terminal device 101, when the VR client determines that the user is viewing a key information area 105 in an imaging panel 104, a render mesh 106 is displayed at a predetermined position between the VR virtual imaging panel and a virtual camera, and key information of the key information area is displayed on the render mesh 106. Therefore, key information in virtual reality content can be presented to the user more clearly, thereby using immersive experience of the user.

Figure 2:
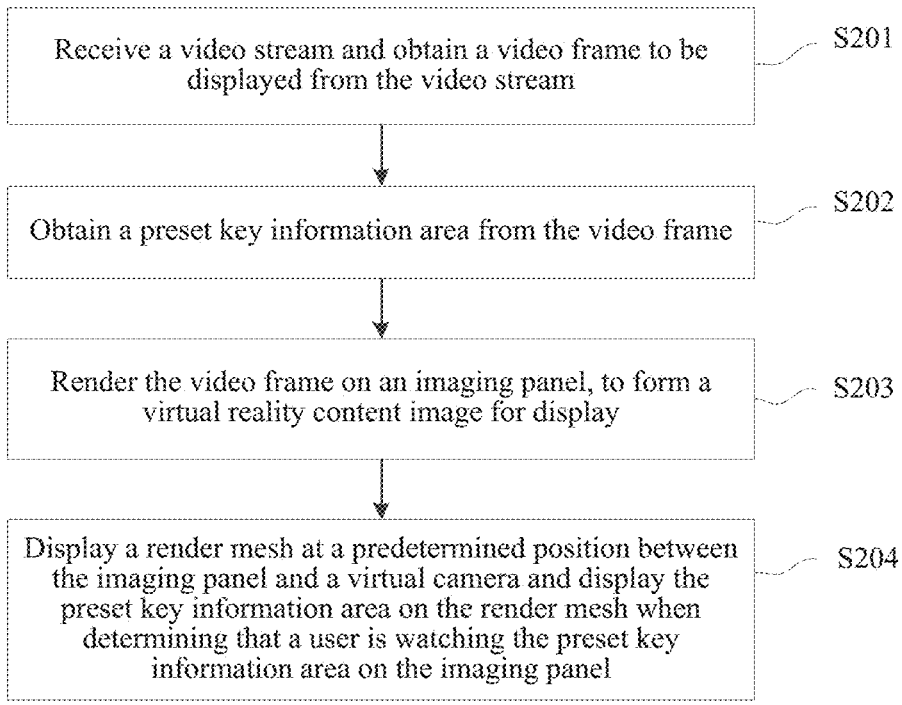
FIG. 2 is a flowchart of a virtual reality content display method according to an embodiment of this application.

FIG. 2 is a flowchart of a virtual reality content display method according to an embodiment of this application. The method is applied to a terminal device, to more clearly present key information in virtual reality content to the user. As shown in FIG. 2, the method 200 includes the following steps:

Step S201: Receive a video stream including a sequence of video frames and obtain a video frame to be displayed from the video stream.

When the user opens the VR client in the terminal device, the terminal device is placed in the VR device. When a VR live video is played, the VR client may obtain a live video stream from a server and decode or parse the video stream frame by frame, and obtain a video frame to be displayed from the video stream. According to this embodiment of this application, the video stream may be a live game video stream. The video frame to be displayed may be a live game video frame in the live game video stream.

Step S202: Identify a preset key information area in the video frame.

According to this embodiment of this application, when obtaining an uploaded live game video, the server may obtain related information of a game, for example, a specific game, and correspondingly, may obtain various parameters and data of the game. In this way, the server may select a content area that the user expects to see more clearly in the live game video as the key information area, such as KDA and a map area in the game. Then, when the server delivers the live game video stream to the VR client, information about the key information area may be carried in the live game video stream.

When obtaining the live game video stream, the VR client may identify, according to the information about the key information area carried in the live game video stream, the key information area in the live game video frame set by the server. The preset key information area, is for example, a rectangular area.

Step S203: Render the video frame on an imaging panel, to form a virtual reality content image for display.

The VR client renders the video frame to be displayed on the imaging panel through a VR technology, to form the virtual reality content image and display the virtual reality content image to the user. The imaging panel is a virtual VR imaging panel rendered through a mesh, and for example, is set at a position 3 to 5 m away from the virtual camera (the position in the middle of two eyes of the user) straight ahead in the VR environment. The imaging panel may be a plane or an arc surface.

For example, when the VR client continuously displays the live game video frame on the imaging panel, to form a dynamic live game video.

Step S204: Display a render mesh at a predetermined position between the imaging panel and a virtual camera and displaying the preset key information area on the render mesh when determining that a user is viewing the preset key information area on the imaging panel.

Figure 3A:
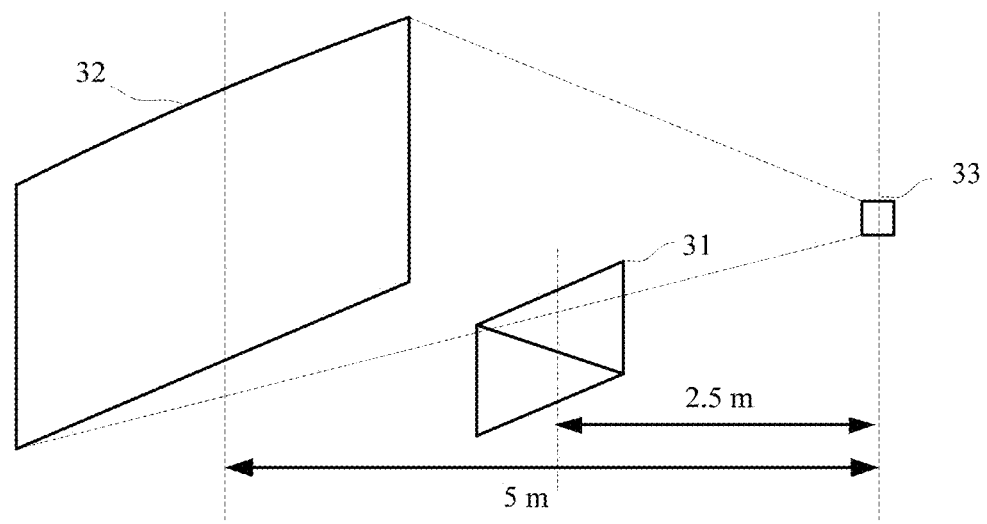
FIG. 3A is a schematic diagram of applying a render mesh in a VR environment according to an embodiment of this application.
Figure 3B:
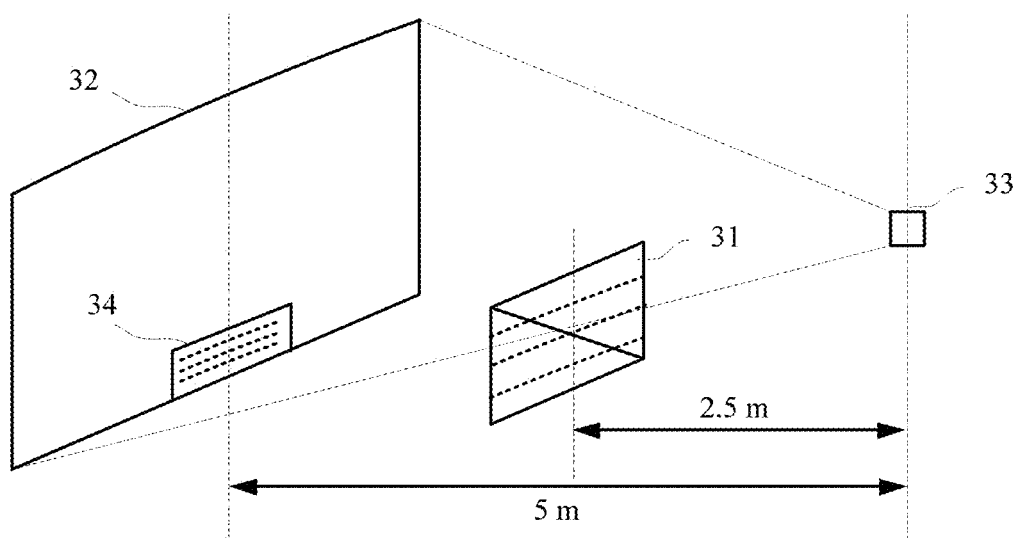
FIG. 3B is a schematic diagram of displaying a preset key information area on a render mesh in a VR environment according to an embodiment of this application.

When the user wears the VR device to view the live game video on the imaging panel, the user may turn the head to see different areas on the imaging panel. The render mesh may be displayed at the predetermined position between the imaging panel and the virtual camera, and the preset key information area is displayed on the render mesh when the VR client determines that the user is viewing the preset key information area on the imaging panel. The render mesh is a mathematical mesh for rendering a model frame in computer graphics. All objects are represented by a mesh including triangles in a computer graphic engine. FIG. 3A is a schematic diagram of applying a render mesh in a VR environment according to an embodiment of this application. The render mesh 31 is at a position 2 to 3 m, such as 2.5 m, away from the imaging panel 32 in the front in the VR environment, and a distance between the render mesh 31 and the virtual camera 33 is also 2.5 m. FIG. 3B is a schematic diagram of displaying a preset key information area on a render mesh in a VR environment according to an embodiment of this application. As shown in FIG. 3B, the preset key information area 34 is displayed on the render mesh 31.

In the virtual reality content display method in this embodiment of this application, the key information area is preset in a virtual display content stream, and when the preset key information area is presented on the terminal device, if the user sees the preset key information area, the preset key information area may be simultaneously displayed on the render mesh. In the virtual reality content display method in this embodiment of this application, a point of interest when the user views the VR live video is considered, so that the user has better viewing experience. In addition, the render mesh is closer to the user and has a larger area, when the key information area is displayed on the render mesh, the user can more clearly see the preset key information area, thereby providing better immersive experience.

FIG. 4 is a flowchart of a virtual reality content display method according to an embodiment of this application and further describes step S202 in FIG. 2 in detail. As shown in FIG. 4, the step of identifying a preset key information area in the video frame in step S202 may include the following steps:

Step S401: Obtain markup information for marking the preset key information area from the video stream.

When delivering the video stream to the VR client, the server marks the preset key information area through markup information in the video stream. When obtaining the video stream, the VR client obtains the corresponding markup information from the video stream if there is the preset key information area. The markup information includes, for example, the position of the preset key information area in the video frame and size information of the preset key information area. The position of the preset key information area in the video frame is, for example, coordinates at a lower left corner of the key information area that are obtained by using coordinates of a frame of game video image at a lower left corner when displayed on the imaging panel as an initial point. The size information of the preset key information area is, for example, a width and a height of a rectangular area at which the preset key information is located.

For example, when the VR client obtains the live game video stream, markup information of a map area may be obtained, and marks the position of the map area in live game video frame and the width and the height.

Step S402: Obtain the marked preset key information area from the video frame according to the markup information.

The VR client obtains, through the markup information, an area of the preset key information in the video frame marked by the markup information.

For example, the VR client obtains the map area through the position of the map area in the live game video stream in the live game video frame and the width and height information.

In the virtual reality content display method according to this embodiment of this application, the preset key information area is obtained by using the markup information of the preset key information area, so that the terminal device conveniently obtains the preset key information area of the server.

FIG. 5 is a flowchart of a virtual reality content display method according to an embodiment of this application and further describes the step of determining that a user is viewing the preset key information area in step S204 of FIG. 2 in detail. As shown in FIG. 5, that the user is viewing the preset key information area on the imaging panel may be determined through the following steps.

Step S501: Determine a display area of the preset key information area on the imaging panel according to the markup information.

Figure 6:
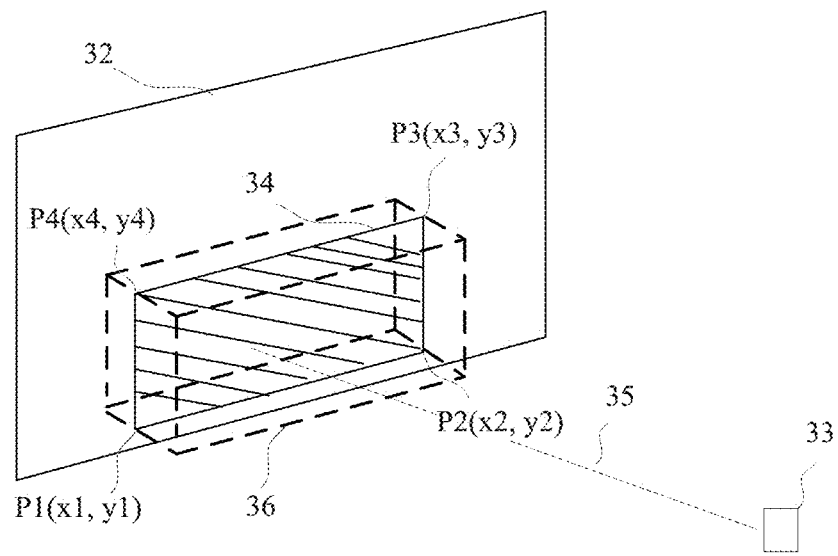
FIG. 6 is a schematic diagram of determining that a user is viewing a preset key information area according to an embodiment of this application.

After obtaining the markup information of the preset key information area, the VR client calculates the display area of the preset key information area on the imaging panel according to the position and the size information of the preset key information area marked by the markup information in the video frame and a size ratio of the preset key information area to the imaging panel. FIG. 6 is a schematic diagram of determining that a user is viewing a preset key information area according to an embodiment of this application. As shown in FIG. 6, the display area 34 of the preset key information area on the imaging panel 32 is, for example, represented by four vertex coordinates P1(x1, y1), P2(x2, y2), P3(x3, y3), and P4(x4, y4) of the display area. x1 to x4 are respectively horizontal coordinates, and y1 to y4 are respectively longitudinal coordinates. The four vertex coordinates are coordinates using an lower left corner of the video frame as an initial point, and a normalized coordinate system may be used. For example, using a lower left corner of the live game video frame displayed on the imaging panel as an initial point, four vertex coordinates of a map area in a game displayed on the imaging panel are obtained.

Step S502: Set a virtual collision body at a position of the display area of the preset key information area, the virtual collision body wrapping the display area of the preset key information area.

With reference to FIG. 6, after obtaining the display area 34 of the preset key information area on the imaging panel 32, the VR client sets a virtual space body 36 at a virtual spatial position where the display area of the preset key information area is located, to wrap the whole or a part of the display area 34 of the preset key information area. The virtual spatial position at which the display area 34 is located is, for example, a central position of the display area of the preset key information area. The central position includes a distance position away from a plane at which the virtual camera is located, a height position in VR rendering space, and the like.

The virtual space body 36 is a virtual space range at the position of the display area 34 of the preset key information area and may be of various shapes. According to this embodiment of this application, the virtual space body may be a virtual space range of a virtual cube or a virtual cuboid wrapping the display area of the key information area. For example, when the display area of the preset key information area is rectangular, and the virtual space body is a virtual cuboid, planes (a plane at which the imaging panel is located) at which the virtual cuboid and the display area are located are the same or a width and a height of a cross section on a parallel plane are respectively equal to a width and a height of the display area, and a depth is provided in a direction perpendicular to a plane at which the display area is located.

When the imaging panel is an arc surface, when the virtual collision body is set, an arc curvature of the imaging panel may be considered.

Step S503: Project a ray from the virtual camera along a user's line of sight direction.

With reference to FIG. 6, the virtual camera 33 includes, for example, two virtual cameras. A ray 35 may be separately projected in real time from the two virtual cameras along a user's line of sight direction, or a ray may be projected from a middle position of the two virtual cameras along a user's line of sight direction. The user's line of sight direction may be, for example, calculated by obtaining real-time parameters such as perpendicular and horizontal angles of the terminal device that are detected by a gyroscope on the terminal device.

Step S504: Confirm that the user is viewing the preset key information area when it is determined that the ray collides with the virtual collision body.

The VR client may determine, through an interface of a 3D engine, whether a ray sent by the virtual camera collides with a virtual collider. That the user is viewing the preset key information area is confirmed when it is determined that the ray collides with the virtual collision body. For example, when either of the two rays projected by the two virtual cameras along the user's line of sight direction collides with the virtual collision body, it is determined that the ray collides with the virtual collision body. Alternatively, when the ray projected from the middle position of the two virtual cameras along the user's line of sight direction collides with the virtual collision body, it is determined that the ray collides with the virtual collision body. That the user is viewing the preset key information area is confirmed when it is determined that the ray collides with the virtual collision body.

In the virtual reality content display method according to this embodiment of this application, whether a user sight collides with the virtual collision body wrapping the display area of the preset key information area is detected. Even if the user views the preset key information area from a plurality of angles, whether the user sees the preset key information area may also be accurately detected.

Figure 7:
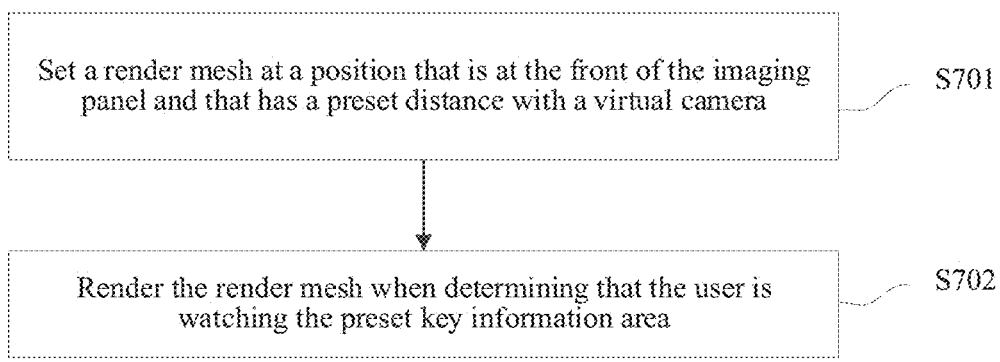
FIG. 7 is a flowchart of a virtual reality content display method according to an embodiment of this application.

FIG. 7 is a flowchart of a virtual reality content display method according to an embodiment of this application. FIG. 7 describes the step of displaying a render mesh at a predetermined position between the imaging panel and a virtual camera in step S204 in FIG. 2 in detail. The step includes the following steps:

Step S701: Set a render mesh at a position that is located between the imaging panel and the virtual camera and whose distance with the virtual camera is a preset value.

The VR client sets a render mesh at a position that is at the front of the imaging panel and that has a preset distance with a virtual camera (human eyes). The 3D graphic engine interface rendering the VR environment includes an interface for hiding displaying) an object, and the render mesh may be hidden or displayed through the interface. For example, the render mesh may be implemented through a function SetActive(false). The preset distance is approximately 2.5 m. The render mesh is, for example, a rectangular render mesh including at least two rendering triangles or may be a render mesh of another shape including another quantity of rendering triangles. The render mesh may have a default material map.

Step S702: Render the render mesh when it is determined that the user is viewing the preset key information area.

When determining that the user is viewing the preset key information area, the VR client renders the render mesh. The user can see the render mesh. A process of rendering the render mesh may be, for example, implemented through a function SetActive(true).

In the virtual reality content display method according to this embodiment of this application, when the user does not see the preset key information area, the VR client does not render the render mesh. The render mesh is hidden to the user. When the user sees the preset key information area, the VR client displays the render mesh and displays the preset key information area on the render mesh, so that the user can more clearly see the preset key information area, and that the user views the whole VR live video is not affected.

Figure 8:
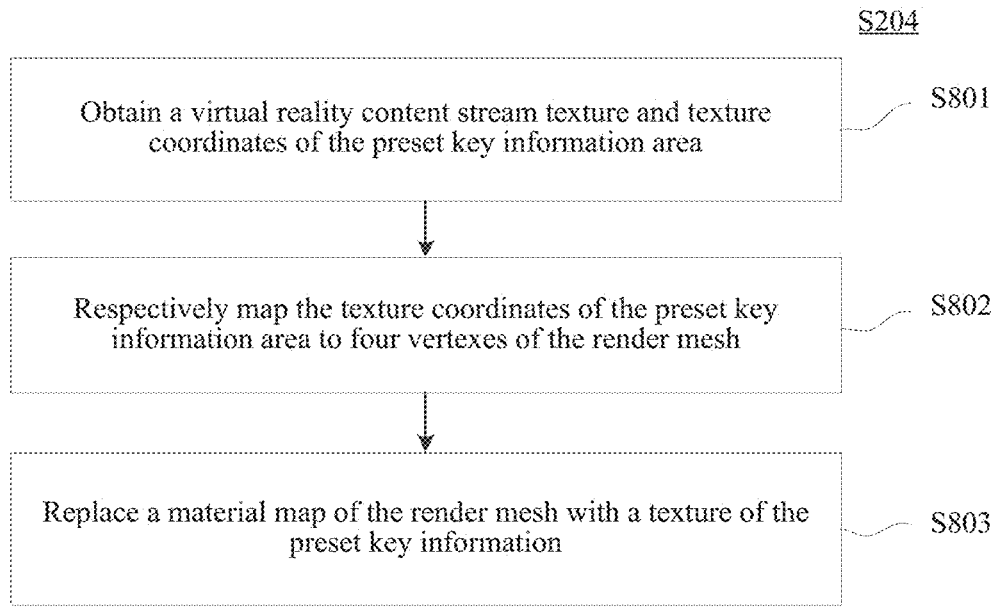
FIG. 8 is a flowchart of a virtual reality content display method according to an embodiment of this application.

FIG. 8 is a flowchart of a virtual reality content display method according to an embodiment of this application. FIG. 8 describes the step of displaying the preset key information area on the render mesh in step S204 of FIG. 1. The step may include:

Step S801: Obtain video stream texture and texture coordinates of the preset key information area.

After displaying the render mesh, the VR client obtains a video stream texture (an image) and coordinates of a texture of the preset key information area from the video stream by decoding the video stream.

Figure 9:
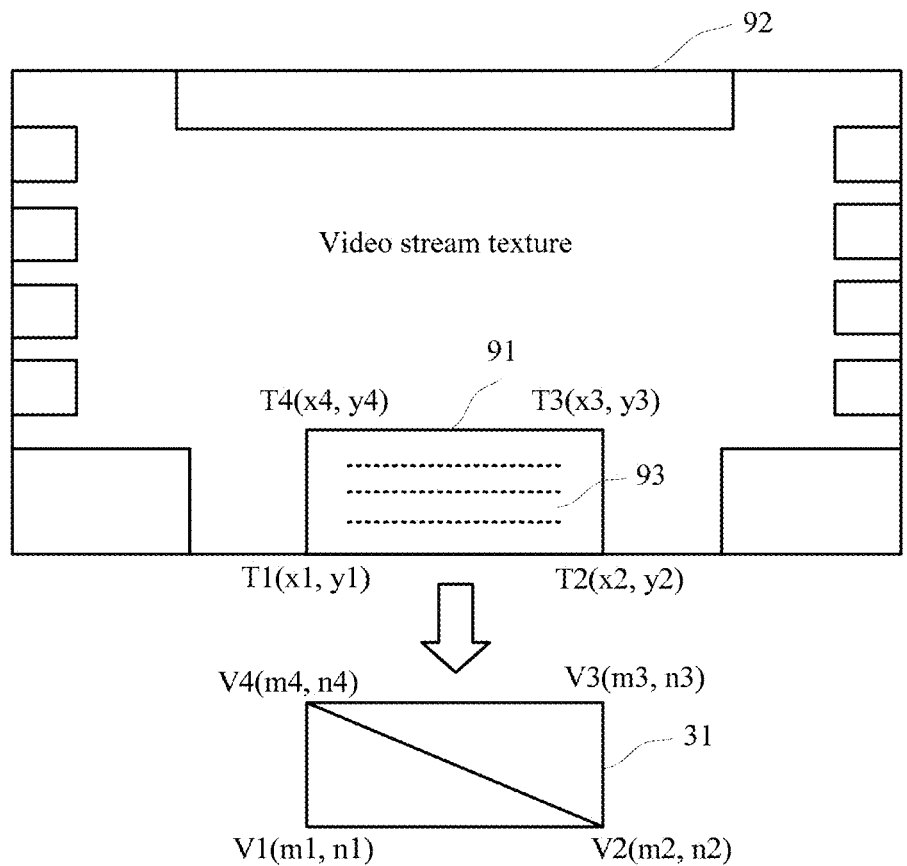
FIG. 9 is a schematic diagram of mapping a key information area to a render mesh according to an embodiment of this application.

The texture coordinates of the preset key information area are, for example, obtained by calculation according to position coordinates and size information of the markup information of the preset key information area. FIG. 9 is a schematic diagram of mapping a key information area to a render mesh according to an embodiment of this application. As shown in FIG. 9, when the preset key information area 91 is rectangular, texture coordinates of the preset key information area are, for example, T1(x1, y1), T2(x2, y2), T3(x3, y3), and T4(x4, y4). x1 to x4 are horizontal coordinates of four vertexes of the rectangular preset key information area, and y1 to y4 are longitudinal coordinates of the four vertexes. A reference initial point of a coordinate system is a lower left corner of the live game video frame 92 at which the preset key information area 91 is located. Coordinates at an upper right corner of a video game video frame are (1,1), and a normalized coordinate system is used.

Step S802: Respectively map the texture coordinates of the preset key information area to four vertexes of the render mesh.

According to this embodiment of this application, as shown in FIG. 9, the render mesh 31 is, for example, a rectangular render mesh including two rendering triangles. Four vertexes thereof are, for example, respectively v1(x1, y1), v2(x2, y2), v3(x3, y3), and v4(x4, y4). x1 to x4 are respectively horizontal coordinates of the four vertexes of the render mesh, and y1 to y4 are respectively longitudinal coordinates of the four vertexes of the render mesh. A reference initial point is a central point of the rectangular render mesh, and a normalized coordinate system is used. The central point is an intersection of two diagonal lines of the rectangular render mesh. Then, the VR client respectively maps four vertex coordinates of the texture of the preset key information area 92 to the four vertex coordinates of the render mesh 31.

Step S803: Replace a material map of the render mesh with a texture of the preset key information.

According to this embodiment of this application, when the render mesh is displayed, a default material map is set. After determining the preset key information area, the VR client replaces the material map of the render mesh with the texture 93 of the preset key information.

Through the foregoing process, the key information of the key information area may be more clearly displayed on the render mesh.

Figure 10:
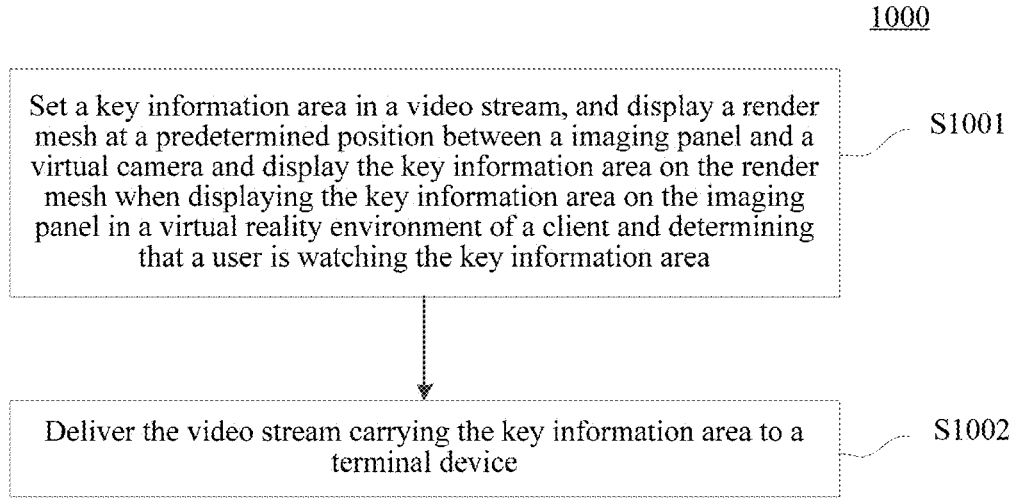
FIG. 10 is a flowchart of a virtual reality content display method according to an embodiment of this application.

FIG. 10 is a flowchart of a virtual reality content display method according to an embodiment of this application, applied to a server end. The server end may have a VR server end corresponding to the VR client. As shown in FIG. 10, the virtual reality content display method 1000 includes the following steps:

Step S1001: Set a key information area in a video stream, and display a render mesh at a predetermined position between a imaging panel and a virtual camera and display the key information area on the render mesh when displaying the key information area on the imaging panel in a virtual reality environment of a client and determining that a user is viewing the key information area.

According to this embodiment of this application, the video stream on the server may be a live video stream or a recorded video stream. For example, when the video stream is a live game video, the server may obtain a video of a specific game. The server may obtain various parameters and data of the game. In this way, the server may set a content area that the user expects to see more clearly in the live game video as the key information area, such as KDA and a map area in the game.

Step S1002: Deliver the video stream carrying the key information area to a terminal device.

According to this embodiment of this application, when the server delivers the live game video stream to the VR client, information about the key information area may be carried in the live game video stream.

the step of setting a key information area in a video stream may include: setting markup information of the key information area in the video stream. The markup information includes a position of the key information area in a video frame and size information of the key information area.

In the virtual reality content display method in this embodiment of this application, a point of interest when the user views the VR live video is considered, so that the user has better viewing experience. In addition, the render mesh is closer to the user and has a larger area, when the key information area is displayed on the render mesh, the user can more clearly see the preset key information area, thereby providing better immersive experience.

Figure 11:
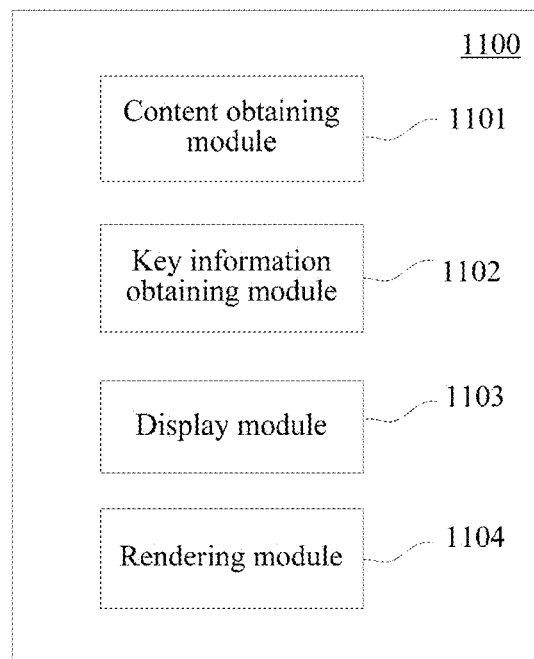
FIG. 11 is a schematic diagram of a virtual reality content display apparatus according to an embodiment of this application.

FIG. 11 is a schematic diagram of a virtual reality content display apparatus according to an embodiment of this application. The apparatus is applied to a terminal device, to more clearly present key information in virtual reality content to the user. As shown in FIG. 11, the apparatus 1100 includes:

a content obtaining module 1101, configured to receive a video stream and obtain a video frame to be displayed from the video stream.

When the user opens the VR client in the terminal device, the terminal device is placed in the VR device. When a VR live video is played, the content obtaining module 1101 may obtain a live video stream from a server and decode or parse the video stream frame by frame, and obtain a video frame to be displayed from the video stream. According to this embodiment of this application, the video stream may be a live game video stream. The video frame to be displayed may be a live game video frame in the live game video stream.

a key information obtaining module 1102, configured to obtain a preset key information area from the video frame.

According to this embodiment of this application, when obtaining an uploaded live game video, the server may obtain related information of a game, for example, a specific game, and correspondingly, may obtain various parameters and data of the game. In this way, the server may select a content area that the user expects to see more clearly in the live game video as the key information area, such as KDA and a map area in the game. Then, when the server delivers the live game video stream to the VR client, information about the key information area may be carried in the live game video stream.

When the VR client obtains the live game video stream, the key information obtaining module 1102 may identify, according to the information about the key information area carried in the live game video stream, the key information area in the live game video frame set by the server. The preset key information area, is for example, a rectangular area.

a display module 1103, configured to render the video frame on an imaging panel, to form a virtual reality content image for display.

The display module 1103 renders the video frame to be displayed on the imaging panel through a VR technology, to form the virtual reality content image and display the virtual reality content image to the user. The imaging panel is a virtual VR imaging panel rendered through a mesh, and for example, is set at a position 3 to 5 m away from the virtual camera (the position in the middle of two eyes of the user) straight ahead in the VR environment. The imaging panel may be a plane or an arc surface.

For example, when the VR client continuously displays the live game video frame on the imaging panel, to form a dynamic live game video.

a rendering module 1104, configured to display a render mesh at a predetermined position between the imaging panel and a virtual camera and display the preset key information area on the render mesh when determining that a user is viewing the preset key information area on the imaging panel.

When the user wears the VR device to view the live game video on the imaging panel, the user may turn the head to see different areas on the imaging panel. The render mesh may be displayed at the predetermined position between the imaging panel and the virtual camera, and the preset key information area is displayed on the render mesh when the rendering module 1104 determines that the user is viewing the preset key information area on the imaging panel. The render mesh is a mathematical mesh for rendering a model frame in computer graphics. All objects are represented by a mesh including triangles in a computer graphic engine. The render mesh may be, for example, at a position 2 to 3 m away from the imaging panel at the front in the VR environment. An area of the render mesh may be set to be greater than the display area of the preset key information area.

In the virtual reality content display apparatus in this embodiment of this application, the key information area is preset in a virtual display content stream, and when the preset key information area is presented on the terminal device, if the user sees the preset key information area, the preset key information area may be simultaneously displayed on the render mesh, in the virtual reality content display method in this embodiment of this application, a point of interest when the user views the VR live video is considered, so that the user has better viewing experience. In addition, the render mesh is closer to the user and has a larger area, when the key information area is displayed on the render mesh, the user can more clearly see the preset key information area, thereby providing better immersive experience.

Figure 12:
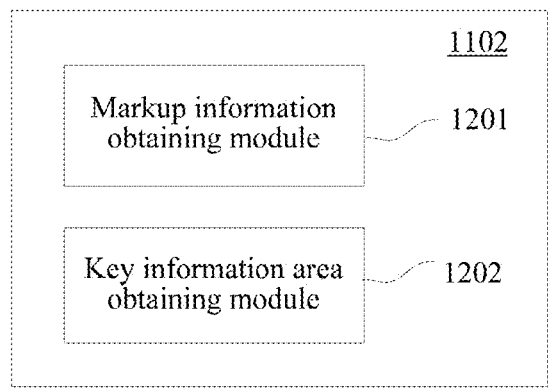
FIG. 12 is a schematic diagram of a virtual reality content display apparatus according to an embodiment of this application.

FIG. 12 is a schematic diagram of a virtual reality content display apparatus according to an embodiment of this application and further describes the key information obtaining module 1102 in FIG. 11 in detail. As shown in FIG. 12, the key information obtaining module 1102 includes:

a markup information obtaining module 1201, configured to obtain markup information of the preset key information area from the video stream.

When delivering the video stream to the VR client, the server marks the preset key information area through markup information in the video stream. When the VR client obtains the video stream, the markup information obtaining module 1001 obtains the corresponding markup information from the video stream if there is the preset key information area. The markup information includes, for example, the position of the preset key information area in the video frame and size information of the preset key information area. The position of the preset key information area in the video frame is, for example, coordinates at a lower left corner of the key information area that are obtained by using coordinates of a frame of game video image at a lower left corner when displayed on the imaging panel as an initial point. The size information of the preset key information area is, for example, a width and a height of a rectangular area at which the preset key information is located.

For example, when the VR client obtains the live game video stream, markup information of a map area may be obtained, and marks the position of the map area in live game video frame and the width and the height.

a key information area obtaining module 1202, configured to obtain the marked preset key information area from the video frame according to the markup information.

The VR client obtains, through the markup information, an area of the preset key information in the video frame marked by the markup information.

For example, the VR client obtains the map area through the position of the map area in the live game video stream in the live game video frame and the width and height information.

In the virtual reality content display apparatus according to this embodiment of this application, the preset key information area is obtained by using the markup information of the preset key information area, so that the terminal device conveniently obtains the preset key information area of the server.

Figure 13:
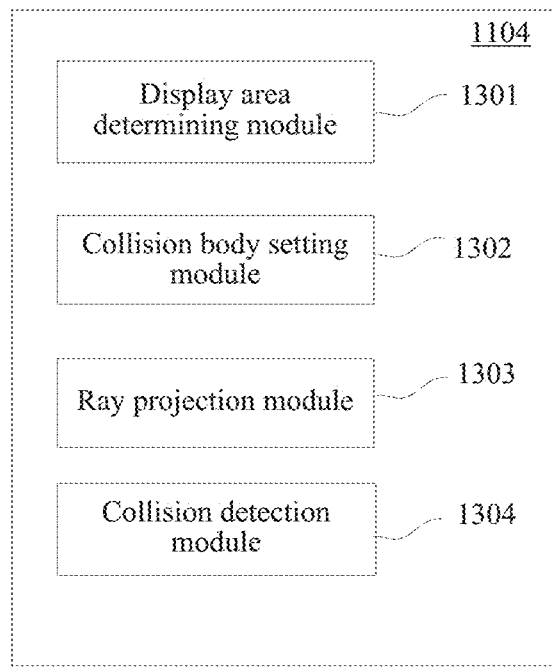
FIG. 13 is a schematic diagram of a virtual reality content display apparatus according to an embodiment of this application.

FIG. 13 is a schematic diagram of a virtual reality content display apparatus according to an embodiment of this application and further describes the rendering module 1104 in FIG. 11 in detail. The apparatus includes the following module for determining that the user is viewing the preset key information area.

a display area determining module 1301, configured to determine a display area of the preset key information area on the imaging panel through the markup information.

After the VR client obtains the markup information of the preset key information area, the display area determining module 1301 calculates the display area of the preset key information area on the imaging panel according to the position and the size information of the preset key information area marked by the markup information in the video frame and a size ratio of the preset key information area to the imaging panel. The display area of the preset key information area on the imaging panel is, for example, represented by four vertex coordinates P1(x1, y1), P2(x2, y2), P3(x3, y3), and P4(x4, y4) of the display area. x1 to x4 are respectively horizontal coordinates, and y1 to y4 are respectively longitudinal coordinates. The four vertex coordinates are coordinates using an lower left corner of the video frame as an initial point, and a normalized coordinate system may be used. For example, using a lower left corner of the live game video frame displayed on the imaging panel as an initial point, four vertex coordinates of a map area in a game displayed on the imaging panel are obtained.

a collision body setting module 1302, configured to set a virtual collision body at a position of the display area of the preset key information area, the virtual collision body wrapping the display area of the preset key information area.

After obtaining the display area of the preset key information area on the imaging panel, the VR client sets a virtual space body at a virtual spatial position where the display area of the preset key information area is located, to wrap the whole or a part of the display area of the preset key information area. The virtual spatial position at which the display area is located is, for example, a central position of the display area of the preset key information area. The central position includes a distance position away from a plane at which the virtual camera is located, a height position in VR rendering space, and the like.

The virtual space body is a virtual space range at the position of the display area of the preset key information area and may be of various shapes. According to this embodiment of this application, the virtual space body may be a virtual space range of a virtual cube or a virtual cuboid wrapping the display area of the key information area. For example, when the display area of the preset key information area is rectangular, and the virtual space body is a virtual cuboid, planes (a plane at which the imaging panel is located) at which the virtual cuboid and the display area are located are the same or a width and a height of a cross section on a parallel plane are respectively equal to a width and a height of the display area, and a depth is provided in a direction perpendicular to a plane at which the display area is located.

When the imaging panel is an arc surface, when the virtual collision body is set, an arc curvature of the imaging panel may be considered.

a ray projection module 1303, configured to project a ray from the virtual came along a user's line of sight direction.

The virtual camera includes, for example, two virtual cameras. A ray may be separately projected in real time from the two virtual cameras along a user's line of sight direction, or a ray may be projected from a middle position of the two virtual cameras along a user's line of sight direction. The user's line of sight direction may be, for example, calculated by obtaining real-time parameters such as perpendicular and horizontal angles of the terminal device that are detected by a gyroscope on the terminal device.

a collision detection module 1304, configured to confirm that the user is viewing the preset key information area when it is determined that the ray collides with the virtual collision body.

The collision detection module 1304 may determine, through an interface of a 3D engine, whether a ray sent by the virtual camera collides with a virtual collider. That the user is viewing the preset key information area is confirmed when it is determined that the ray collides with the virtual collision body. For example, when either of the two rays projected by the two virtual cameras along the user's line of sight direction collides with the virtual collision body, the collision detection module 1304 may determine that the ray collides with the virtual collision body. Alternatively, when the ray projected from the middle position of the two virtual cameras along the user's line of sight direction collides with the virtual collision body, it is determined that the ray collides with the virtual collision body. That the user is viewing the preset key information area is confirmed when it is determined that the ray collides with the virtual collision body.

In the virtual reality content display apparatus according to this embodiment of this application, whether a user sight collides with the virtual collision body wrapping the display area of the preset key information area is detected. Even if the user views the preset key information area from a plurality of angles, whether the user sees the preset key information area may also be accurately detected.

Figure 14:
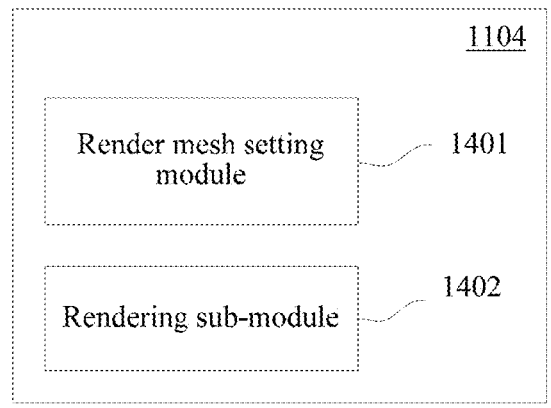
FIG. 14 is a schematic diagram of a virtual reality content display apparatus according to an embodiment of this application.

FIG. 14 is a schematic diagram of a virtual reality content display apparatus according to an embodiment of this application. FIG. 7 describes how to display a render mesh at a predetermined position between the imaging panel and a virtual camera through the following module in the rendering module 1104 in FIG. 11. The rendering module 1104 includes:

a render mesh setting module 1401, configured to set a render mesh at a position that is located between the imaging panel and the virtual camera and whose distance with the virtual camera is a preset value.

The VR client sets a render mesh at a position that is at the front of the imaging panel and that has a preset distance with a virtual camera (human eyes). The 3D graphic engine interface rendering the VR environment includes an interface for hiding (not displaying) an object, and the render mesh may be hidden or displayed through the interface. For example, the render mesh may be implemented through a function SetActive(false). The preset distance is approximately 2.5 m. The render mesh is, for example, a rectangular render mesh including at least two rendering triangles or may be a render mesh of another shape including another quantity of rendering triangles. The render mesh may have a default material map.

a rendering sub-module 1402, configured to render the render mesh when it is determined that the user is viewing the preset key information area.

When determining that the user is viewing the preset key information area, the VR client renders the render mesh. The user can see the render mesh. A process of rendering the render mesh may be, for example, implemented through a function SetActive(true).

In the virtual reality content display apparatus according to this embodiment of this application, when the user does not see the preset key information area, the VR client does not render the render mesh. The render mesh is hidden to the user. When the user sees the preset key information area, the VR client displays the render mesh and displays the preset key information area on the render mesh, so that the user can more clearly see the preset key information area, and that the user views the whole VR live video is not affected.

Figure 15:
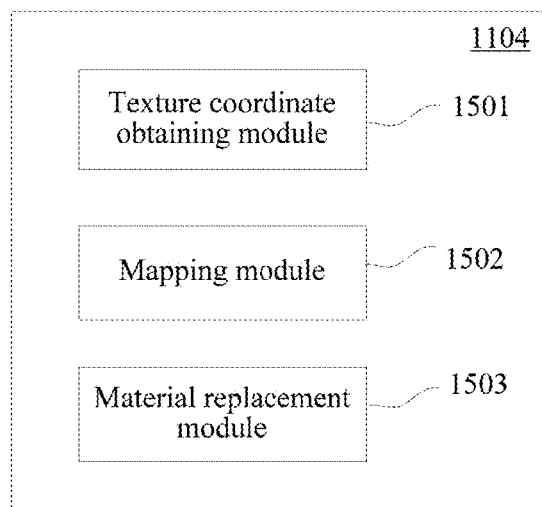
FIG. 15 is a schematic diagram of a virtual reality content display apparatus according to an embodiment of this application.

FIG. 15 is a schematic diagram of a virtual reality content display apparatus according to an embodiment of this application. FIG. 15 describes how to display the preset key information area on the render mesh through the following module in the rendering module 1104 of FIG. 11. The rendering module 1104 may include:

a texture coordinate obtaining module 1501, configured to obtain a video stream texture and texture coordinates of the preset key information area.

After the VR client displays the render mesh, the texture coordinate obtaining module 1401 obtains a video stream texture (an image) and coordinates of a texture of the preset key information area from the video stream by decoding the video stream. The texture coordinates of the preset key information area are, for example, obtained by calculation according to position coordinates and size information of the markup information of the preset key information area. When the preset key information area is rectangular, texture coordinates of the preset key information area are, for example, T1(x1, y1), T2(x2, y2), T3(x3, y3), and T4(x4, y4). x1 to x4 are horizontal coordinates of four vertexes of the rectangular preset key information area, and y1 to y4 are longitudinal coordinates of the four vertexes. A reference initial point of a coordinate system is a lower left corner of the live game video frame at which the preset key information area is located. Coordinates at an upper right corner of a video game video frame are (1,1), and a normalized coordinate system is used.

a mapping module 1502, configured to respectively map the texture coordinates of the preset key information area to four vertexes of the render mesh.

According to this embodiment of this application, the render mesh is a rectangular render mesh including two rendering triangles. Four vertexes thereof are, for example, respectively v1(x1, y1), v2(x2, y2), v3(x3, y3), and v4(x4, y4). x1 to x4 are respectively horizontal coordinates of the four vertexes of the render mesh, and y1 to y4 are respectively longitudinal coordinates of the four vertexes of the render mesh. A reference initial point is a central point of the rectangular render mesh, and a normalized coordinate system is used. The central point is an intersection of two diagonal lines of the rectangular render mesh. Then, the VR client maps four vertex coordinates of the texture of the preset key information area to the four vertex coordinates of the render mesh.

a material replacement module 1503, configured to replace a material map of the render mesh with a texture of the preset key information.

According to this embodiment of this application, when the render mesh is displayed, there is a default material map. After determining the preset key information area, the material replacement module 1503 replaces the material map of the render mesh with the texture of the preset key information.

Through the foregoing modules, the key information of the key information area may be more clearly displayed on the render mesh.

Figure 16:
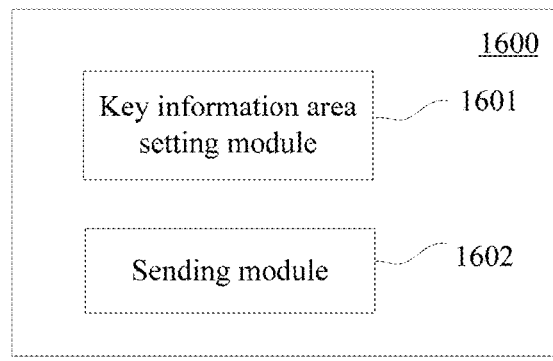
FIG. 16 is a schematic diagram of a virtual reality content display apparatus according to an embodiment of this application.

FIG. 16 is a schematic diagram of a virtual reality content display apparatus according to an embodiment of this application, applied to a server end. The server end may have a VR server end corresponding to the VR client. As shown in FIG. 16, the virtual reality content display apparatus 1600 includes the following modules:

a key information area setting module 1601, configured to set a key information area in a video stream, and display a render mesh at a predetermined position between a imaging panel and a virtual camera and display the key information area on the render mesh when displaying the key information area on the imaging panel in a virtual reality environment of a client and determining that a user is viewing the key information area.

According to this embodiment of this application, the video stream on the server may be a live video stream or a recorded video stream. For example, when the video stream is a live game video, the server may obtain a video of a specific game. The server may obtain various parameters and data of the game. In this way, the server may set a content area that the user expects to see more clearly in the live game video as the key information area, such as KDA and a map area in the game.

a sending module 1602, configured to deliver the video stream carrying the key information area to a terminal device.

According to this embodiment of this application, when the server delivers the live game video stream to the VR client, information about the key information area may be carried in the live game video stream.

The key information area setting module may include a markup information setting module 1603, configured to set markup information of the key information area in the video stream. The markup information includes a position of the key information area in a video frame and size information of the key information area.

In the virtual reality content display apparatus in this embodiment of this application, a point of interest when the user views the VR live video is considered, so that the user has better viewing experience. In addition, the render mesh is closer to the user and has a larger area, when the key information area is displayed on the render mesh, the user can more clearly see the preset key information area, thereby providing better immersive experience.

In addition, the virtual reality content display method, the application client, the application server, and modules in the embodiments of this application may be integrated into one processing unit, or each of the modules may exist alone physically, or two or more apparatuses or modules may be integrated into one unit. The integrated units may be implemented in a form of hardware or may be implemented in a form of a software functional unit.

In some embodiments, the application client and/or application server may be run in various computing devices capable of performing virtual reality content display processing and loaded in the memory of the computing device.

Figure 17:
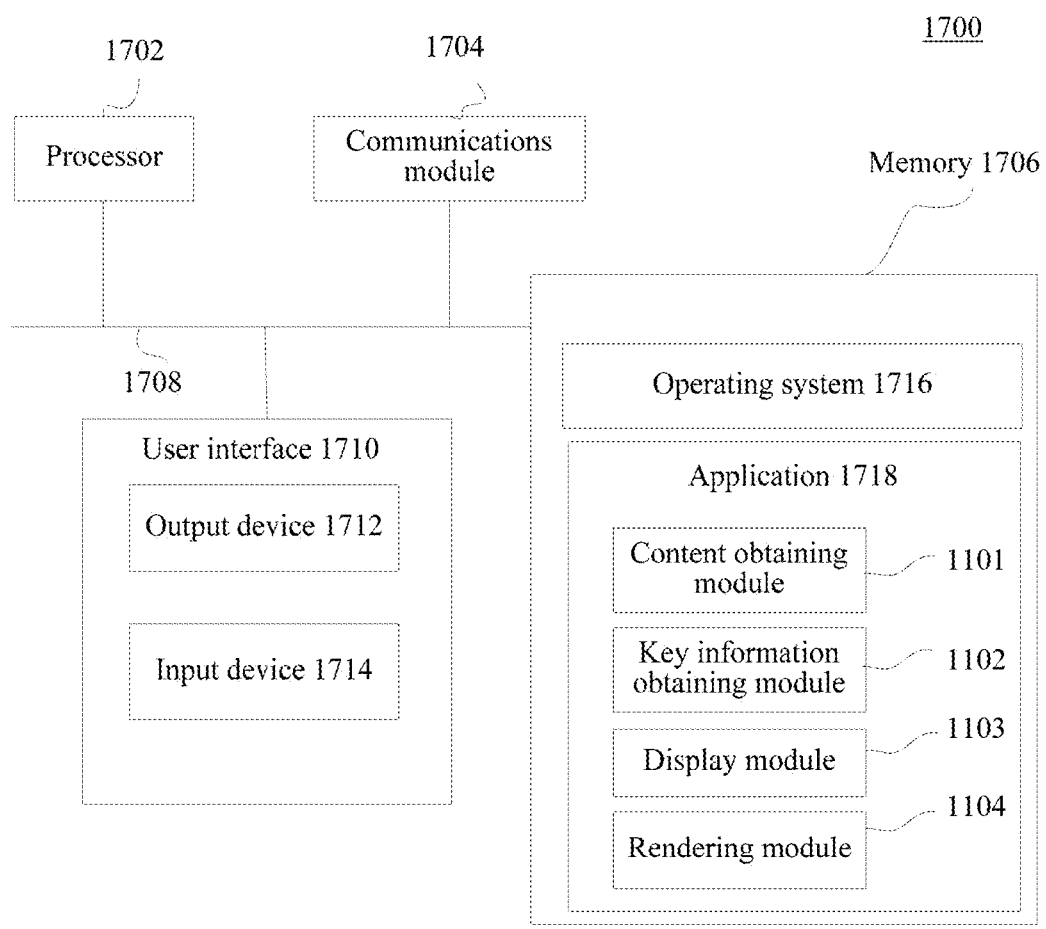
FIG. 17 is a structural diagram of compositions of a computing device at which an application client is located.

FIG. 17 is a structural diagram of compositions of a computing device at which an application client is located. As shown in FIG. 17, the computing device 1700 includes one or more processors (CPU) 1702, a communications module 1704, a memory 1706, a user interface 1710, and a communications bus 1708 for interconnecting these components.

The processor 1702 may implement network communication and/or local communication by receiving and sending data through the communications module 1704.

The user interface 1710 includes one or more output devices 1712, including one or more speakers and/or one or more visualization displays. The user interface 1710 further includes one or more input devices 1714, including a keyboard, a mouse, a sound command input unit or a microphone, a touch display, a touch-sensitive input panel, a posture capturing camera, another input key or control, or the like.

The memory 1706 may be a high-speed random access memory such as a DRAM, an SRAM, a DDR RAM, or other random access solid-state memory devices or a non-volatile memory such as one or more magnetic disk storage devices, optical disc storage devices, flash memory devices, or other non-volatile solid-state memory devices.

The memory 1706 stores an instruction set that can be executed by the processor 1702 and includes:

an operating system 1716, including a program used for processing various basic system services and for executing hardware-related tasks; and an application 1718, including various programs for implementing virtual reality content display processing, the programs being capable of implementing processing process in the foregoing embodiments, for example, including an application client.

In some embodiments, the application 1718 may include at least one of modules 1101 to 1104 shown in FIG. 11, and the modules 1101 to 1104 may store a computer executable instruction. The processor 1702 executes the computer executable instruction in the at least one of the modules 1101 to 1104 in the memory 1706, to implement a function of the at least one of the modules 1101 to 1104. The application 1718 may further include modules shown in FIG. 12 to FIG. 15. Details are not described herein again.

Figure 18:
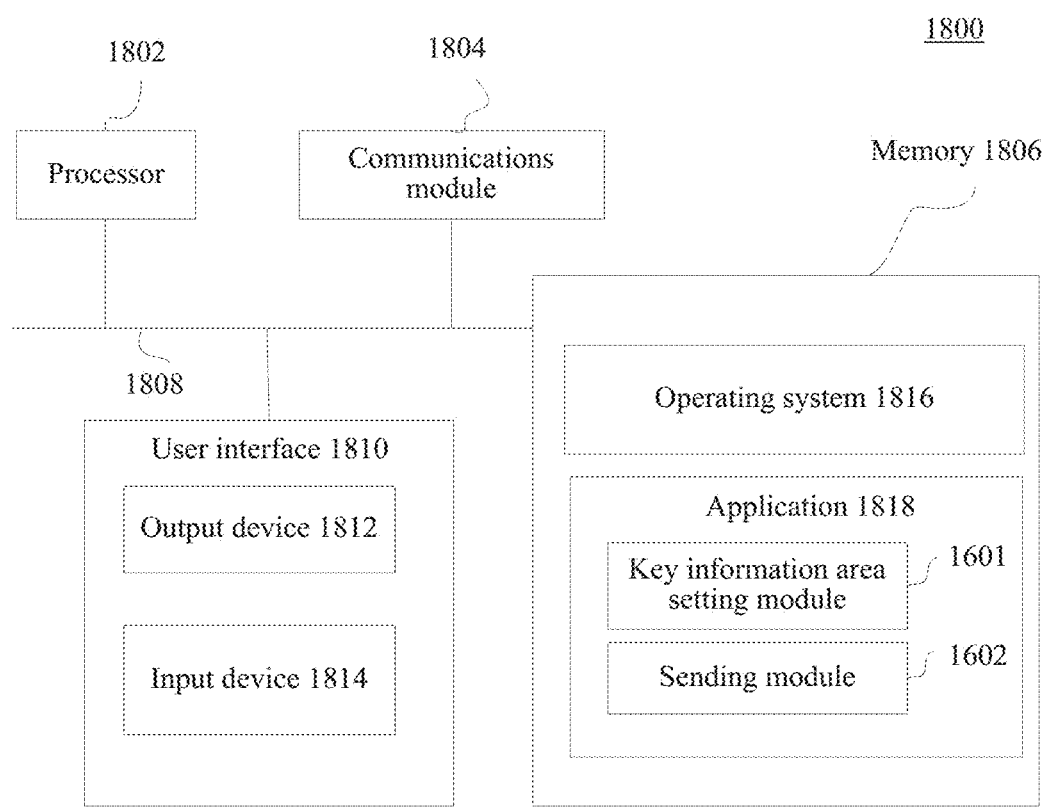
FIG. 18 is a structural diagram of compositions of a computing device at which an application server is located.

FIG. 18 is a structural diagram of compositions of a computing device at which an application server is located. As shown in FIG. 18, the computing device 1800 includes one or more processors (CPU) 1802, a communications module 1804, a memory 1806, a user interface 1810, and a communications bus 1808 for interconnecting these components.

The processor 1802 may implement network communication and/or local communication by receiving and sending data through the communications module 1804.

The user interface 1810 includes one or more output devices 1812, including one or more speakers and/or one or more visualization displays. The user interface 1810 further includes one or more input devices 1814, including a keyboard, a mouse, a sound command input unit or a microphone, a touch display, a touch-sensitive input panel, a posture capturing camera, another input key or control, or the like.

The memory 1806 may be a high-speed random access memory such as a DRAM, an SRAM, a DDR RAM, or other random access solid-state memory devices or a non-volatile memory such as one or more magnetic disk storage devices, optical disc storage devices, flash memory devices, or other non-volatile solid-state memory devices.

The memory 1806 stores an instruction set that can be executed by the processor 1802 and includes:

an operating system 1816, including a program used for processing various basic system services and for executing hardware-related tasks; and an application 1818, including various programs for implementing virtual reality content display processing, the programs being capable of implementing processing process in the foregoing embodiments, for example, including an application server.

In some embodiments, the application 1818 may include at least one of modules 1601 to 1602 shown in FIG. 16, and the modules 1601 to 1602 may store a computer executable instruction. The processor 1802 executes the computer executable instruction in the at least one of the modules 1601 to 1602 in the memory 1806, to implement a function of the at least one of the modules 1601 to 1602.

An embodiment of this application provides a virtual reality content display apparatus, including a memory, a processor, and a computer program stored on the memory and capable of being run on the processor, when executing the computer program, the processor implementing the following steps:

receiving a video stream and obtaining a video frame to be displayed from the video stream;

identifying a preset key information area in the video frame;

rendering the video frame on an imaging panel, to form a virtual reality content image for display; and displaying a render mesh at a predetermined position between the imaging panel and a virtual camera and displaying the preset key information area on the render mesh when determining that a user is viewing the preset key information area on the imaging panel.

The step of identifying a preset key information area in the video frame includes:

obtaining markup information for marking the preset key information area from the video stream; and obtaining the marked preset key information area from the video frame according to the markup information.

The markup information includes a position of the preset key information area in the virtual reality content frame and size information of the preset key information area.

The step of determining that a user is viewing the preset key information area includes:

determining a display area of the preset key information area on the imaging panel according to the markup information;

setting a virtual collision body at a position of the display area of the preset key information area, the virtual collision body wrapping the display area of the preset key information area;

projecting a ray from the virtual camera along a user's line of sight direction; and confirming that the user is viewing the preset key information area when it is determined that the ray collides with the virtual collision body.

The step of setting a virtual collision body at a position of the display area of the preset key information area, the virtual collision body wrapping the display area of the preset key information area includes: setting a virtual space body at a virtual spatial position where the display area of the preset key information area is located, to wrap at least a part of the display area of the preset key information area.

The virtual camera includes two virtual cameras, a ray is separately projected from the two virtual cameras, and the step of determining that the ray collides with the virtual collision body includes: determining that either of the two rays projected by the two virtual cameras collides with the collision body.

The step of displaying a render mesh at a predetermined position between the imaging panel and a virtual camera includes:

setting a render mesh at a position that is located between the imaging panel and the virtual camera and whose distance with the virtual camera is a preset value; and rendering the render mesh when it is determined that the user is viewing the preset key information area.

The step of displaying the preset key information area on the render mesh includes:

obtaining a video stream texture and texture coordinates of the preset key information area;

respectively mapping the texture coordinates of the preset key information area to four vertexes of the render mesh; and replacing a material map of the render mesh with a texture of the preset key information area.

An embodiment of this application further provides a virtual reality content display apparatus, including a memory, a processor, and a computer program stored on the memory and capable of being run on the processor, when executing the computer program, the processor implementing the following steps:

setting a key information area in a video stream, and displaying a render mesh at a predetermined position between a imaging panel and a virtual camera and displaying the key information area on the render mesh when displaying the key information area on the imaging panel in a virtual reality environment of a client and determining that a user is viewing the key information area; and delivering the video stream carrying the key information area to a terminal device.

The step of setting a key information area in a video stream includes: setting markup information of the key information area in the video stream.

The markup information includes a position of the key information area in a video frame and size information of the key information area.

In addition, each embodiment of this application may be implemented by a data processing program that is executed by a data processing device such as a computer. Apparently, the data processing program constitutes this application. In addition, generally, a data processing program stored in a storage medium is directly read from the storage medium for execution or the program is installed on or replicated to a storage device (such as a hard disk or memory) of the data processing device for execution. Therefore, such a storage medium also constitutes the present invention. The storage medium may use any type of recording, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, this application further discloses a non-volatile readable storage medium, storing a computer readable instruction, at least one processor executing the computer readable instruction to perform any embodiment of the foregoing method of this application.

In addition, steps of the method of this application may also be implemented hardware as well as a software program. For example, the steps may be implemented by a logic gate, a switch, an application specific integrated circuit (ASIC), a programmable logic controller, an embedded microcontroller, and the like. Therefore, such hardware capable of implementing the method of this application may also constitute this application.

The foregoing disclosure is merely exemplary embodiments of this application, and certainly is not intended to limit the protection scope of this application, Therefore, equivalent variations made in accordance with the claims of this application shall fall within the scope of this application.

What is claimed is:

1. A virtual reality content display method performed at a computing device having one or more processors and memory storing programs to be executed by the one or more processors, the method comprising:

receiving a video stream including a sequence of video frames of a live video game;

obtaining a video frame to be displayed from the video stream;

identifying a preset key information area in the video frame, wherein the preset key information area includes a map of the video game, video game statistics, or a map of the video game and video game statistics;

rendering the video frame on an imaging panel, to form a virtual reality content image for display;

determining that the preset key information area is being viewed by a user along a line of sight direction; and in accordance with the determination, generating an instance of the preset key information area from the preset key information area in the video frame; and displaying the generated instance of the preset key information area at a position in front of the imaging panel and closer to the user along the line of sight direction while maintaining the display of the video frame including the preset key information area on the imaging panel, further including:

setting a rectangular render mesh at a position that is located between the imaging panel and a virtual camera and whose distance with the virtual camera is a preset value; the rectangular render mesh including two rendering triangles having four vertices, and a central point of an intersection of two diagonal lines of the rectangular render mesh is used to map four vertices of the preset key information area to the four vertices of the rectangular render mesh.

2. The method according to claim 1, wherein the step of identifying a preset key information area in the video frame comprises:

obtaining markup information of the preset key information area from the video stream, wherein the markup information is provided by a server; and obtaining the marked preset key information area from the video frame according to the markup information.

3. The method according to claim 2, wherein the markup information comprises a position of the preset key information area in the virtual reality content frame and size information of the preset key information area.

4. The method according to claim 2, wherein the step of determining that a user is viewing the preset key information area comprises:

determining a display area of the preset key information area on the imaging panel according to the markup information;

setting a virtual collision body at a position of the display area of the preset key information area, the virtual collision body wrapping the display area of the preset key information area;

projecting a ray from a virtual camera along a user's line of sight direction; and confirming that the user is viewing the preset key information area when it is determined that the ray collides with the virtual collision body.

5. The method according to claim 4, wherein the step of setting a virtual collision body at a position of the display area of the preset key information area, the virtual collision body wrapping the display area of the preset key information area comprises:

setting a virtual space body at a virtual spatial position where the display area of the preset key information area is located, to wrap at least a part of the display area of the preset key information area.

6. The method according to claim 4, wherein the virtual camera comprises two virtual cameras, a ray is separately projected from the two virtual cameras, and the ray collides with the virtual collision body when either of the two rays projected by the two virtual cameras collides with the collision body.

7. The method according to claim 1, wherein the step of displaying the generated instance of the preset key information area comprises:

obtaining a video stream texture and texture coordinates of the preset key information area;

respectively mapping the texture coordinates of the preset key information area to four vertexes of the render mesh; and replacing a material map of the render mesh with a texture of the preset key information area.

8. A computing device comprising one or more processors, memory coupled to the one or more processors and a plurality of programs stored in the memory that, when executed by the one or more processors, cause the computing device to perform a plurality of operations comprising:
receiving a video stream including a sequence of video frames;
obtaining a video frame to be displayed from the video stream;
identifying a preset key information area in the video frame, wherein the preset key information area includes a map of the game, game statistics, or a map of the game and game statistics;
rendering the video frame on an imaging panel, to form a virtual reality content image for display;
determining that the preset key information area is being viewed by a user along a line of sight direction; and
in accordance with the determination,
generating an instance of the preset key information area from the preset key information area in the video frame; and
displaying the generated instance of the preset key information area at a position in front of the imaging panel and closer to the user along the line of sight direction while maintaining the display of the video frame including the preset key information area on the imaging panel, further including:
setting a rectangular render mesh at a position that is located between the imaging panel and a virtual camera and whose distance with the virtual camera is a preset value; the rectangular render mesh including two rendering triangles having four vertices, and a central point of an intersection of two diagonal lines of the rectangular render mesh is used to map four vertices of the preset key information area to the four vertices of the rectangular render mesh.

9. The computing device according to claim 8, wherein the operation of identifying a preset key information area in the video frame comprises:
obtaining markup information of the preset key information area from the video stream, wherein the markup information is provided by a server; and
obtaining the marked preset key information area from the video frame according to the markup information.

10. The computing device according to claim 9, wherein the markup information comprises a position of the preset key information area in the virtual reality content frame and size information of the preset key information area.

11. The computing device according to claim 9, wherein the operation of determining that a user is viewing the preset key information area comprises:
determining a display area of the preset key information area on the imaging panel according to the markup information;
setting a virtual collision body at a position of the display area of the preset key information area, the virtual collision body wrapping the display area of the preset key information area;
projecting a ray from a virtual camera along a user's line of sight direction; and
confirming that the user is viewing the preset key information area when it is determined that the ray collides with the virtual collision body.

12. The computing device according to claim 11, wherein the operation of setting a virtual collision body at a position of the display area of the preset key information area, the virtual collision body wrapping the display area of the preset key information area comprises:
setting a virtual space body at a virtual spatial position where the display area of the preset key information area is located, to wrap at least a part of the display area of the preset key information area.

13. The computing device according to claim 11, wherein the virtual camera comprises two virtual cameras, a ray is separately projected from the two virtual cameras, and the ray collides with the virtual collision body when either of the two rays projected by the two virtual cameras collides with the collision body.

14. The computing device according to claim 8, wherein the operation of displaying the generated instance of the preset key information area on the render mesh comprises:
obtaining a video stream texture and texture coordinates of the preset key information area;
respectively mapping the texture coordinates of the preset key information area to four vertexes of the render mesh; and
replacing a material map of the render mesh with a texture of the preset key information area.

15. A non-transitory computer readable storage medium storing a plurality of machine readable instructions in connection with a computing device having one or more processors, wherein the plurality of machine readable instructions, when executed by the one or more processors, cause the terminal to perform a plurality of operations including:
receiving a video stream including a sequence of video frames;
obtaining a video frame to be displayed from the video stream;
identifying a preset key information area in the video frame, wherein the preset key information area includes a map of the game, game statistics, or a map of the game and game statistics;
rendering the video frame on an imaging panel, to form a virtual reality content image for display;
determining that the preset key information area is being viewed by a user along a line of sight direction; and
in accordance with the determination,
generating an instance of the preset key information area from the preset key information area in the video frame; and
displaying the generated instance of the preset key information area at a position in front of the imaging panel and closer to the user along the line of sight direction while maintaining the display of the video frame including the preset key information area on the imaging panel, further including:
setting a rectangular render mesh at a position that is located between the imaging panel and a virtual camera and whose distance with the virtual camera is a preset value; the rectangular render mesh including two rendering triangles having four vertices, and a central point of an intersection of two diagonal lines of the rectangular render mesh is used to map four vertices of the preset key information area to the four vertices of the rectangular render mesh.

16. The non-transitory computer readable storage medium according to claim 15, wherein the operation of identifying a preset key information area in the video frame comprises:
obtaining markup information of the preset key information area from the video stream, wherein the markup information is provided by a server; and
obtaining the marked preset key information area from the video frame according to the markup information.

17. The non-transitory computer readable storage medium according to claim 15, wherein the operation of displaying the generated instance of the preset key information area on the render mesh comprises:
  obtaining a video stream texture and texture coordinates of the preset key information area;
  respectively mapping the texture coordinates of the preset key information area to four vertexes of the render mesh; and
  replacing a material map of the render mesh with a texture of the preset key information area.

* * * * *